(12) United States Patent
Jeon et al.

(10) Patent No.: US 10,201,920 B2
(45) Date of Patent: Feb. 12, 2019

(54) APPARATUS FOR FORMING POLYMER, COMPRISING POLYMER BACKFLOW PREVENTION PORTION

(71) Applicant: LG Hausys, Ltd., Seoul (KR)

(72) Inventors: Byung Joo Jeon, Seoul (KR); Eung Kee Lee, Anyang-si (KR); Chul June Choi, Cheongju-si (KR); Myeong Hee Kim, Anyang-si (KR); Ji Mun Kim, Seoul (KR); Seung Wook Ji, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 191 days.

(21) Appl. No.: 14/650,392

(22) PCT Filed: Dec. 12, 2013

(86) PCT No.: PCT/KR2013/011510
§ 371 (c)(1),
(2) Date: Jun. 8, 2015

(87) PCT Pub. No.: WO2014/092470
PCT Pub. Date: Jun. 19, 2014

(65) Prior Publication Data
US 2016/0185020 A1 Jun. 30, 2016

(30) Foreign Application Priority Data
Dec. 12, 2012 (KR) .................. 10-2012-0144487

(51) Int. Cl.
*B29C 44/34* (2006.01)
*B29C 45/18* (2006.01)

(52) U.S. Cl.
CPC ...... *B29C 44/3446* (2013.01); *B29C 45/1816* (2013.01)

(58) Field of Classification Search
CPC ................ B29C 44/3446; B29C 45/1816
(Continued)

(56) References Cited

U.S. PATENT DOCUMENTS 3,981,649 A 9/1976 Shimano et al.
4,043,715 A * 8/1977 Hendry ............... B29C 44/3442
264/50

(Continued)

FOREIGN PATENT DOCUMENTS

FR 1476159 A 4/1967
JP 06339974 A 12/1994
(Continued)

OTHER PUBLICATIONS

Korean Notice of Allowance dated Mar. 22, 2016 in connection with the counterpart Korean Patent Application No. 10-2012-0144487.
(Continued)

*Primary Examiner* — Yogendra N Gupta
*Assistant Examiner* — Emmanuel S Luk
(74) *Attorney, Agent, or Firm* — Hauptman Ham, LLP

(57) ABSTRACT

The present invention provides an apparatus for forming a polymer, comprising: a chamber having a predetermined pressure and storing a molten polymer resin; a foaming agent injection portion connected to the chamber and supplying a foaming agent, which is supplied from the outside, into the chamber by forming a pressure equal to or higher than the pressure inside the chamber; and a polymer backflow prevention portion provided at the foaming agent injection portion, and through which the supplied foaming agent passes so as to increase a contact surface area with the polymer resin, thereby preventing the backflow of the polymer resin.

2 Claims, 7 Drawing Sheets

(58) Field of Classification Search
USPC .................................................. 425/812, 149
See application file for complete search history.

(56) References Cited

U.S. PATENT DOCUMENTS

| | | | | |
|---|---|---|---|---|
| 4,081,225 A * | 3/1978 | Yaita | ...................... | B29C 33/10 |
| | | | | 249/141 |
| 4,124,336 A * | 11/1978 | Johnson | .............. | B29C 44/3442 |
| | | | | 137/539.5 |
| 4,709,837 A * | 12/1987 | Erdman | .................... | A61J 3/02 |
| | | | | 222/368 |
| 4,783,292 A * | 11/1988 | Rogers | .................. | B29C 44/421 |
| | | | | 264/328.7 |
| 5,098,267 A * | 3/1992 | Cheng | .................. | B29B 7/7414 |
| | | | | 264/50 |
| 5,480,589 A * | 1/1996 | Belser | .................. | B01F 5/0619 |
| | | | | 261/76 |
| 5,997,783 A * | 12/1999 | Hunter | .................. | B29C 44/588 |
| | | | | 264/276 |
| 6,322,347 B1 * | 11/2001 | Xu | ...................... | B29C 44/3442 |
| | | | | 264/211 |
| 6,367,765 B1 * | 4/2002 | Wieder | .................. | B22C 9/067 |
| | | | | 249/141 |
| 6,602,063 B1 * | 8/2003 | Cardona | ............. | B29C 44/3446 |
| | | | | 425/135 |
| 6,602,064 B1 * | 8/2003 | Chen | .................. | B29C 44/3446 |
| | | | | 425/204 |
| 6,773,640 B2 * | 8/2004 | Sugihara | ............. | B29C 44/3446 |
| | | | | 264/328.7 |
| 7,144,532 B2 * | 12/2006 | Kim | .................... | B29C 44/3446 |
| | | | | 264/40.1 |
| 7,267,534 B2 | 9/2007 | Xu | | |
| 7,318,713 B2 * | 1/2008 | Xu | ...................... | B29C 44/3446 |
| | | | | 425/208 |
| 7,360,749 B2 * | 4/2008 | Hirose | .................... | B29C 33/10 |
| | | | | 249/141 |
| 7,530,803 B2 * | 5/2009 | Seroka | .................... | B29C 33/10 |
| | | | | 249/141 |
| 7,576,035 B2 * | 8/2009 | Ohno | .................. | B01D 39/2075 |
| | | | | 264/177.12 |
| 8,342,830 B2 * | 1/2013 | Sugata | .................. | B29C 33/10 |
| | | | | 425/28.1 |
| 8,820,391 B2 * | 9/2014 | Zanatta | .................. | B22C 9/067 |
| | | | | 164/305 |
| 9,108,350 B2 * | 8/2015 | Kim | .................... | B29C 44/3446 |
| 9,962,868 B2 * | 5/2018 | Kato | ....................... | B29C 44/02 |
| 2001/0033040 A1 * | 10/2001 | Cardona | ............. | B29C 44/3446 |
| | | | | 264/51 |
| 2002/0119209 A1 * | 8/2002 | Tanaka | ............... | B29D 30/0629 |
| | | | | 425/46 |
| 2002/0147244 A1 * | 10/2002 | Kishbaugh | .......... | B29C 45/0001 |
| | | | | 521/50 |
| 2003/0059567 A1 * | 3/2003 | Cediel | .................... | B29C 44/583 |
| | | | | 428/54 |
| 2003/0232106 A1 * | 12/2003 | Wurtele | .................. | B29C 45/52 |
| | | | | 425/567 |
| 2004/0012107 A1 * | 1/2004 | Xu | ...................... | B29C 44/3446 |
| | | | | 264/39 |
| 2005/0009936 A1 | 1/2005 | Xu | | |
| 2007/0051832 A1 * | 3/2007 | Jones | ..................... | B29B 7/481 |
| | | | | 239/398 |
| 2007/0108663 A1 | 5/2007 | Yusa et al. | | |
| 2009/0163605 A1 * | 6/2009 | Kamiyama | ......... | B01F 3/04446 |
| | | | | 516/10 |
| 2011/0304066 A1 * | 12/2011 | Obara | .................. | B29C 44/586 |
| | | | | 264/51 |
| 2017/0043503 A1 * | 2/2017 | Suzuki | .................... | B29C 47/10 |

FOREIGN PATENT DOCUMENTS

| | | |
|---|---|---|
| JP | 2000238099 A | 9/2000 |
| JP | 2002079545 A | 3/2002 |
| JP | 2003525780 A | 9/2003 |
| JP | 2004237729 A | 8/2004 |
| JP | 2005532939 A | 11/2005 |
| JP | 2008001015 A | 1/2008 |
| JP | 2012232558 A | 11/2012 |
| KR | 1020030007452 A | 1/2003 |
| KR | 1020030050833 A | 6/2005 |
| WO | 0166331 A1 | 9/2001 |

OTHER PUBLICATIONS

European Extended Search Report dated Dec. 21, 2015 in connection with the counterpart European Patent Application No. 13863333.4.

International Search Report for PCT/KR2013/011510 filed on Mar. 24, 2014.

Japanese Office Action dated Dec. 15, 2017 in connection with the counterpart Japanese Patent Application No. 2015-547853.

* cited by examiner

APPARATUS FOR FORMING POLYMER, COMPRISING POLYMER BACKFLOW PREVENTION PORTION

TECHNICAL FIELD

The present invention relates to a polymer forming apparatus having a polymer backflow prevention unit, and more particularly, to a polymer forming apparatus which has a polymer backflow prevention unit to efficiently prevent backflow of a molten polymer material toward a foaming agent injection gate.

BACKGROUND ART

In general, polymer forming technologies are used to manufacture various plastic products by melting polymer grains, i.e. pellets, with electric heat and mechanical friction and then extruding the molten polymer pellets into a mold or dies having a desired shape. Since material costs account for a very high percentage of total costs, foaming technologies have been developed in order to reduce material cost and decrease the weight of a polymer product.

Foaming technologies form a lot of minute bubbles in a polymer product, in which a foaming agent is chemically or physically mixed with a polymer material and heat or pressure is applied to the mixture from outside such that foaming materials can be evaporated from the mixture, thereby forming bubbles inside the product. When the bubbles are generated, most portions of the product are occupied by the bubbles, thereby enabling significant reduction in production costs, decrease in weight of the product, and thermal-insulation performance due to the bubbles.

Typically, a physical foaming process is performed by injecting foaming gas into a molten polymer resin within a cylinder or barrel of an injection or extrusion machine.

The foaming gas is injected into the barrel through a gas injection gate. In this case, if an internal pressure of the barrel filled with the polymer resin is higher than injection pressure of the foaming gas, the polymer resin flows back to the gas injection gate and clogs the gas injection gate.

In this case, the process is delayed until repair of the gas injection gate is finished, and there can be loss of components in the apparatus.

Korean Patent Publication No. 10-2003-0050833 (published on Jun. 25, 2003) discloses a check valve that prevents gas from flowing back to a gas supplier.

DISCLOSURE

Technical Problem

It is an aspect of the present invention to provide a polymer forming apparatus, which has a polymer backflow prevention unit to efficiently prevent a molten polymer material from flowing back to a foaming agent injection gate.

Technical Solution

In accordance with one aspect of the present invention, a polymer forming apparatus includes: a chamber having a predetermined pressure and storing a molten polymer resin; a foaming agent injector connected to the chamber and supplying a foaming agent received from an outside into the chamber by a pressure higher than or equal to a pressure inside the chamber; and a polymer backflow prevention unit provided to the foaming agent injector and allowing the supplied foaming agent to pass therethrough while preventing the polymer resin from flowing back by increasing a contact surface area with the polymer resin.

The foaming agent injector may include: a foaming agent injection pipe which includes an inlet channel forming an inlet for a foaming agent, an outlet channel forming an outlet for the foaming agent, and a middle channel connecting the inlet channel to the outlet channel and having a smaller inner diameter than the inlet channel and the outlet channel; and an elastic shut-off unit elastically disposed inside the outlet channel to be placed at an outlet side of the middle channel, and opening or closing the middle channel according to supplying pressure of the foaming agent.

The polymer backflow prevention unit may be disposed at an end of the outlet channel and the elastic shut-off unit may be supported by the polymer backflow prevention unit.

The outlet channel may be connected to a lower end of the middle channel, and has an inclined channel having an inner diameter gradually increasing downward from the lower end of the middle channel.

The elastic shut-off unit may include a shut-off ball disposed in the inclined channel and opening or closing the inclined channel, and an elastic member elastically and mutually supporting the shut-off ball and the polymer backflow prevention unit.

The polymer backflow prevention unit may include: a backflow-prevention plate body disposed at the end of the outlet channel and supporting an end of the elastic member; and a plurality of backflow prevention holes formed in the backflow-prevention plate body.

The backflow prevention holes may have a polygonal shape.

The backflow prevention holes may be tapered in a direction of supplying the foaming agent.

The backflow prevention holes may include a plurality of protrusions formed on an inner circumference thereof.

The backflow-prevention plate body may be detachably coupled to the end of the outlet channel.

The backflow prevention plate may be inclined from an edge toward a center in the direction of supplying the foaming agent.

Advantageous Effects

According to embodiments of the present invention, in a physical foam forming process for thermoplastic polymer materials, it is possible to efficiently prevent a polymer resin from flowing back to a channel of a foaming agent injection pipe, thereby preventing process loss.

That is, backflow prevention holes each having a polygonal shape increase a surface area to volume ratio of the polymer resin, and thus the polymer resin having higher viscosity than foaming gas is prevented from flowing back to the channel of the foaming agent injection pipe by resistance of the backflow prevention holes.

Further, the foaming gas increases a surface area to volume ratio of gas through the plurality of backflow prevention holes and is thus more rapidly melted into the polymer resin.

BEST MODE

Hereinafter, a polymer forming apparatus including a polymer backflow prevention unit according to one embodiment of the present invention, will be described with reference to the accompanying drawings.

Figure 1:
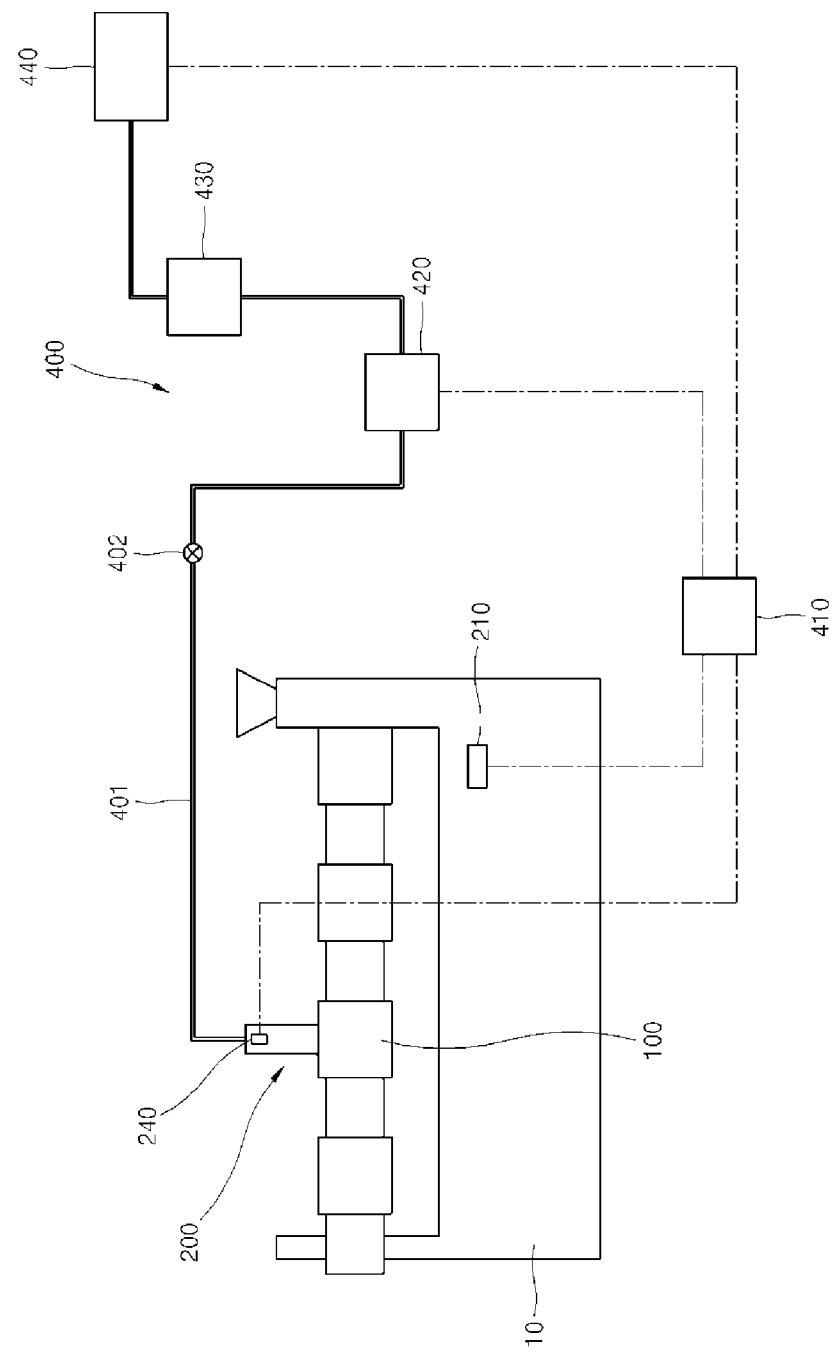
FIG. 1 is a schematic view of a polymer forming apparatus including a polymer backflow prevention unit according to one embodiment of the present invention.

FIG. 1 is a schematic view of a polymer forming apparatus including a polymer backflow prevention unit according to one embodiment of the present invention.

Figure 2:
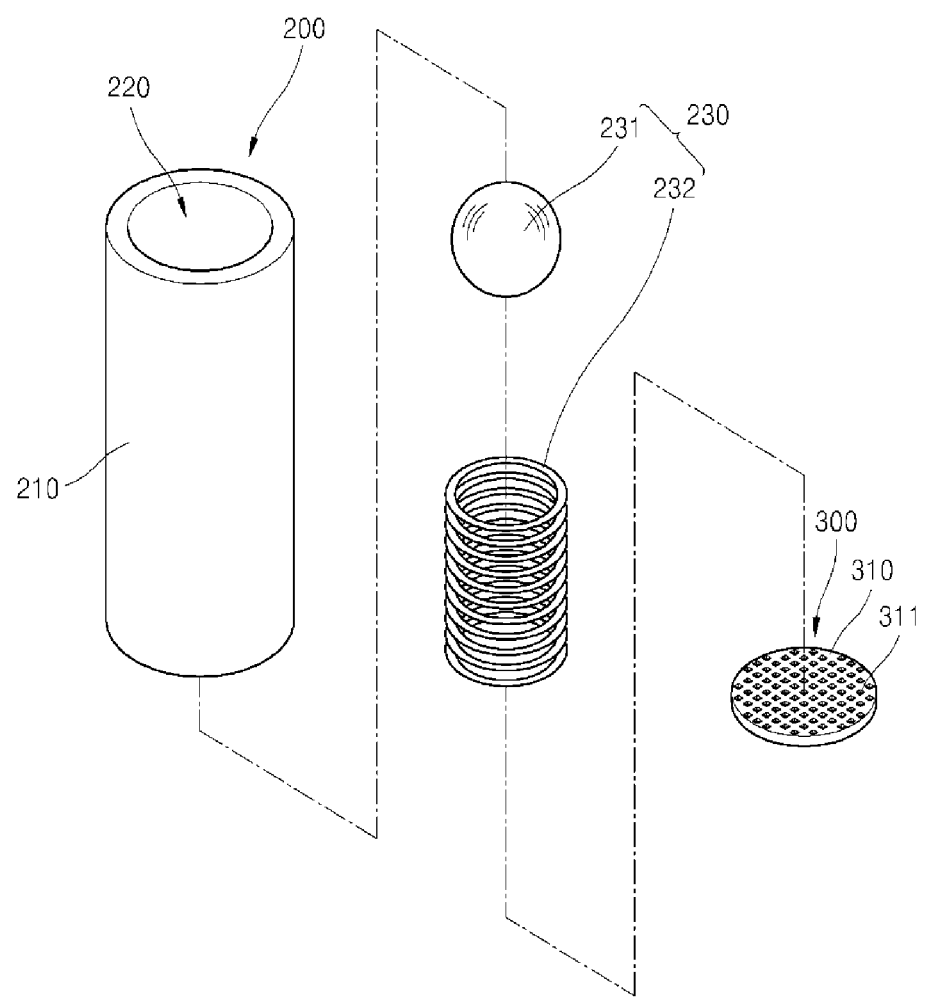
FIG. 2 is an exploded perspective view of a foaming agent injector according to one embodiment of the present invention.

Referring to FIG. 1, the polymer forming apparatus includes a chamber 100, a foaming agent injector 200, and a polymer backflow prevention unit 300 (see FIG. 2).

The chamber 100 stores a predetermined amount of polymer resin. The chamber 100 has a predetermined internal pressure.

The foaming agent injector 200 supplies or injects a foaming agent received from the outside into the chamber 100 by a predetermined pressure. Here, the pressure for supplying the foaming agent may be higher than or equal to the internal pressure of the chamber 100.

The foaming agent injector 200 will be described below in more detail.

Figure 3:
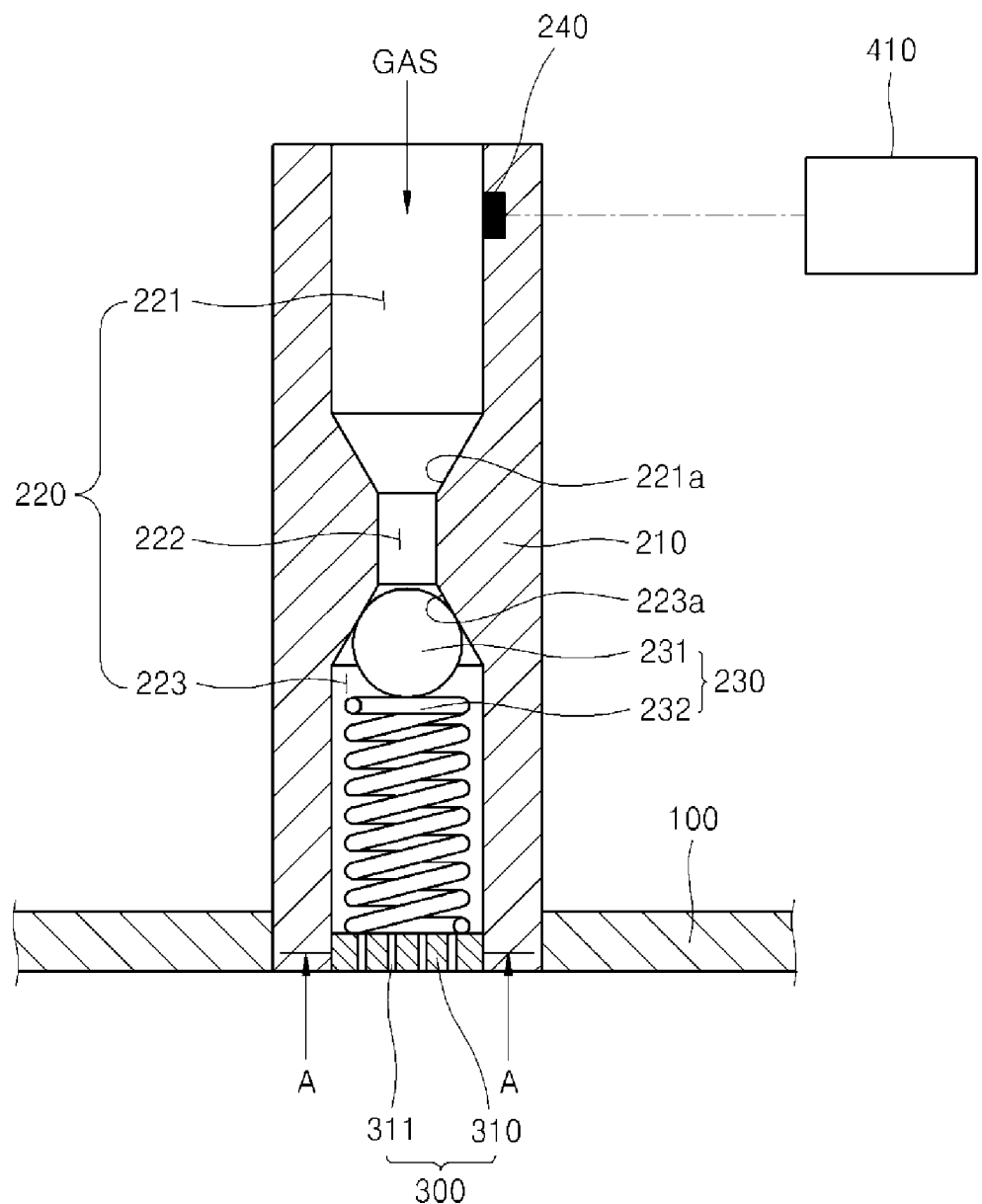
FIG. 3 is a partial sectional view of the foaming agent injector according to one embodiment of the present invention before supply of a foaming agent.

FIGS. 2 and 3 illustrate a foaming agent injector according to one embodiment of the present invention.

Referring to FIGS. 2 and 3, the foaming agent injector 200 includes a foaming agent injection pipe 210 and an elastic shut-off unit 230.

The foaming agent injection pipe 210 is connected to an upper end of the chamber 100.

The foaming agent injection pipe 210 has a hollow shape and includes a channel 220 in which a foaming agent flows.

Referring to FIG. 3, the channel 220 is formed to vertically penetrate the foaming agent injection pipe 210, and includes an inlet channel 221, a middle channel 222 and an outlet channel 223.

The inner diameters of the inlet channel 221 and the outlet channel 223 may be the same or different from each other. The inner diameters of the inlet channel 221 and the outlet channel 223 may be varied depending on an injection amount of the foaming agent.

The middle channel 222 connects the inlet channel 221 to the outlet channel 223 and has an inner diameter smaller than the inner diameters of the inlet channel 221 and the outlet channel 223.

In addition, the inlet channel 221 has an inlet-side inclined channel 221a, which is connected to an upper end of the middle channel 222 and has an inner diameter gradually decreasing toward the upper end of the middle channel 222.

Further, the outlet channel 223 has an outlet-side inclined channel 223a, which is connected to a lower end of the middle channel 222 and has an inner diameter gradually increasing toward the lower end of the middle channel 222.

That is, the outlet-side inclined channel 223a has a cross-section which becomes enlarged downward along the lower end of the middle channel 222.

The inlet-side inclined channel 221a and the outlet-side inclined channel 223a are symmetrical to each other with respect to the middle channel 222.

The outlet channel 223 is provided with the elastic shut-off unit 230.

The elastic shut-off unit 230 includes a shut-off ball 231 and an elastic member 232.

The shut-off ball 231 is disposed in the outlet channel 223, particularly in the outlet-side inclined channel 223a.

The elastic member 232 elastically and mutually supports the shut-off ball 231 and the polymer backflow prevention unit 300 disposed at a lower end of the outlet channel 223.

The elastic member 232 includes an elastic spring having a predetermined coefficient of elasticity.

The elastic member 232 has a coefficient of elasticity sufficient to be pressed down by the shut-off ball 231 under a supplying pressure of the foaming agent and open the middle channel 222 and the outlet channel 223, when the foaming agent is supplied through the inlet channel 221 and the middle channel 222.

Therefore, when the supplying pressure of the foaming agent is released, the shut-off ball 231 returns to its original position by elasticity of the elastic member 232.

The polymer backflow prevention unit 300 is disposed at the lower end of the outlet channel 223.

The polymer backflow prevention unit 300 includes a backflow-prevention plate body 310 and a plurality of backflow prevention holes 311.

The backflow-prevention plate body 310 may be formed in a circular disc shape and detachably coupled to the lower end of the outlet channel 223.

For a detachable structure, a screw coupling structure may be employed. For example, although not shown in the drawings, an outer circumference of the backflow-prevention plate body 310 and an inner wall of the outlet channel 223 may be screwed to each other.

The plurality of backflow prevention holes 311 may have a polygonal shape.

Figure 5:
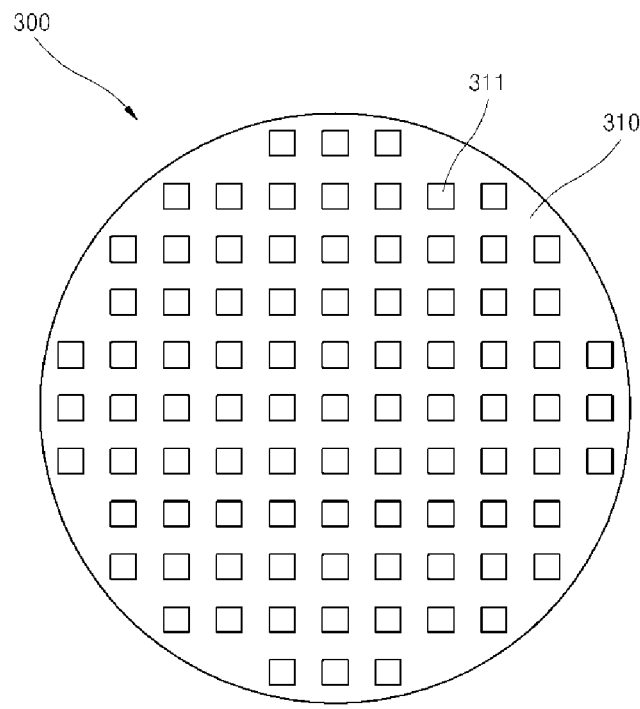
FIG. 5 is a partial sectional view of one example of the polymer backflow prevention unit according to the embodiment of the present invention.

As shown in FIG. 2 and FIG. 5, the backflow prevention holes 311 may have a rectangular shape.

Figure 6:
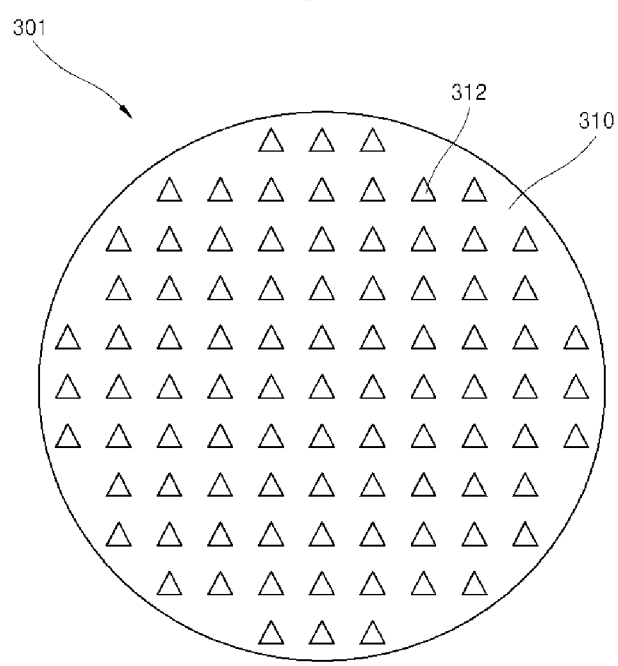
FIG. 6 is a partial sectional view of another example of the polymer backflow prevention unit according to the embodiment of the present invention.
Figure 7:
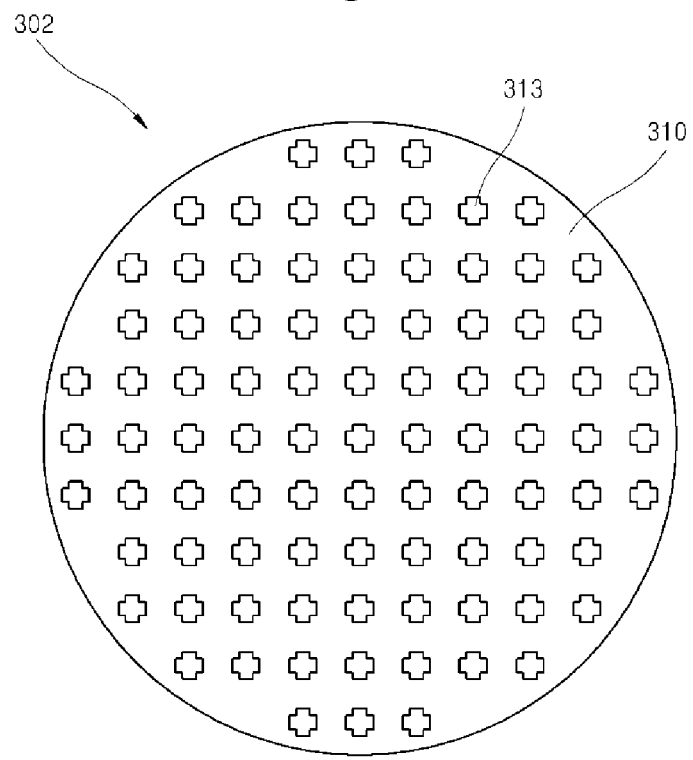
FIG. 7 is a partial sectional view of a further example of the polymer backflow prevention unit according to the embodiment of the present invention.

Alternatively, backflow prevention holes 312 may have a triangular shape as shown in FIG. 6, or backflow prevention holes 313 may have a cross shape as shown in FIG. 7.

Figure 8:
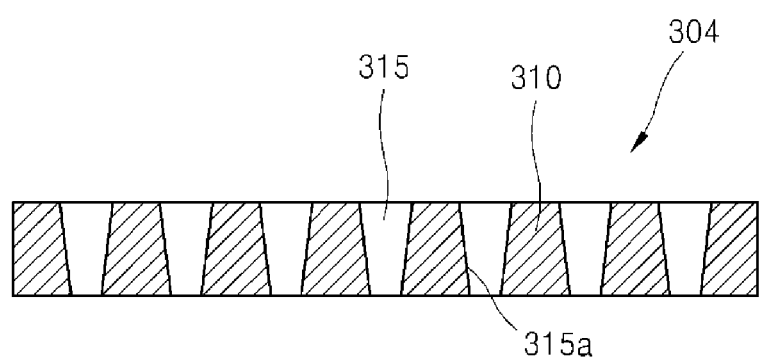
FIG. 8 is a partial sectional view of yet another example of the polymer backflow prevention unit according to the embodiment of the present invention.

Alternatively, as shown in FIG. 8, a plurality of backflow prevention holes 315 may be tapered in a direction of supplying the foaming agent.

That is, the inner diameter of each of the backflow prevention holes 315 has an inclined surface 315a in a downward direction.

When the foaming agent is an incompressible fluid, a speed of supplying the foaming agent may increase in the supply direction.

In addition, since the inner diameters of the backflow prevention holes 315 gradually increase in an opposite direction to the supply direction for the foaming agent, it is possible to minimize the amount of foaming agent reversely introduced into the backflow prevention holes 315 and flowing back upward.

Figure 9:
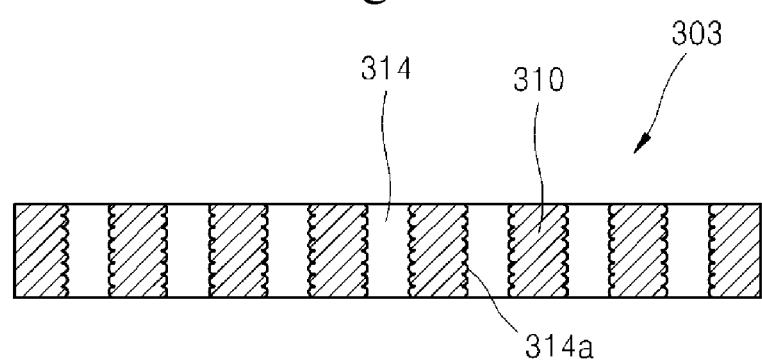
FIG. 9 is a partial sectional view of yet another example of the polymer backflow prevention unit according to the embodiment of the present invention.

Further, as shown in FIG. 9, a plurality of backflow prevention holes 314 may include a plurality of protrusions 314a formed on an inner circumference thereof to protrude in an inward direction.

According to the present invention, the polymer forming apparatus may further include a first pressure sensor 240 for sensing pressure generated during supply of the foaming agent, and a second pressure sensor 20 placed in a main body 10 of the apparatus and sensing pressure of a resin inside the chamber 100.

The first pressure sensor 240 may sense the pressure of the foaming agent during supply of the foaming agent.

The first pressure sensor 240 may be disposed at an inner upper end of the foaming agent injection pipe 210, or may be disposed on a foaming agent supply line 401.

The first and second pressure sensors 240, 20 are electrically connected to a controller 410, which receives data regarding the pressure of the foaming agent during supply of the foaming agent and the pressure of the resin inside the main body 10, which are sensed by the first and second pressure sensors 240 and 20.

Further, the foregoing foaming agent injector 200 is connected to a foaming agent supply unit 400.

The foaming agent supply unit 400 includes a foaming agent storage 440, a chiller 430, a pump 420, a valve 402, and a foaming agent supply line 401.

The foaming agent supply line 401 is connected to the inlet channel 221 of the foaming agent injection pipe 210.

The valve 402 is disposed on the foaming agent supply line 401 and opens or closes the foaming agent supply line 401 in response to a control signal from the controller 410.

The pump 420 is disposed on the foaming agent supply line 401 and forcibly supplies the foaming agent along the foaming agent supply line 401 in response to a control signal from the controller 410.

The chiller 430 and the foaming agent storage 440 are disposed on the foaming agent supply line 401.

The chiller 430 may be optionally provided depending on the kind of foaming agent.

That is, use of the chiller 430 is determined depending on the kind of foaming agent. For example, the chiller 430 may be used when carbon dioxide is used as a foaming agent.

MODES FOR INVENTION

Next, operation of a plastic forming apparatus with the foregoing structure will be described.

Referring to FIG. 1, the controller 410 uses the pump 420 to force a foaming agent stored in the foaming agent storage 440 to flow along the foaming agent supply line 401. In this case, the controller 410 opens the valve 402.

Herein, foaming gas will be described as an example of the foaming agent.

Thus, the foaming gas flows along the foaming agent supply line 401 and is then supplied to the foaming agent injection pipe 210.

Referring to FIG. 3, the foaming gas is introduced into the inlet channel 221. At this time, the first pressure sensor 240 senses the pressure of the foaming gas injected into the channel 220 and transmits the sensed pressure to the controller 410.

Then, the foaming gas applies a predetermined pressure to the shut-off ball 231 while entering the middle channel 222, and the shut-off ball 231 is pressed down to thereby compress the elastic member 232.

As the shut-off ball 231 is pressed down, the middle channel 222 and the outlet channel 223 communicate with each other.

Thus, the foaming gas flows from the middle channel 222 to the outlet channel 223 and is then injected into the chamber 100 via the plurality of backflow prevention holes 311 formed in the polymer backflow prevention unit 300, thereby foaming a polymer resin stored in the chamber 100.

At this time, the second pressure sensor 20 senses an internal pressure of the chamber 100 and transmits the sensed pressure to the controller 410.

When the pressure of the foaming gas is higher than the internal pressure of the chamber 100, the controller 410 continues supplying the foaming gas. On the other hand, when the pressure of the foaming gas is lower than the internal pressure of the chamber 100, the controller 410 closes the valve 402 and stops supplying the foaming gas.

This serves to prevent the polymer resin from flowing back from the chamber 100 to the foaming agent injection pipe 210 when the internal pressure of the chamber 100 is higher than the pressure of supplying the foaming gas.

Further, the polymer backflow prevention unit 300 disposed at the lower end of the foaming agent injection pipe 210 increases a contact surface area with the polymer resin when the polymer resin flows back, thereby preventing the polymer resin from flowing back to the channel 220 of the foaming agent injection pipe 210.

Figure 4:
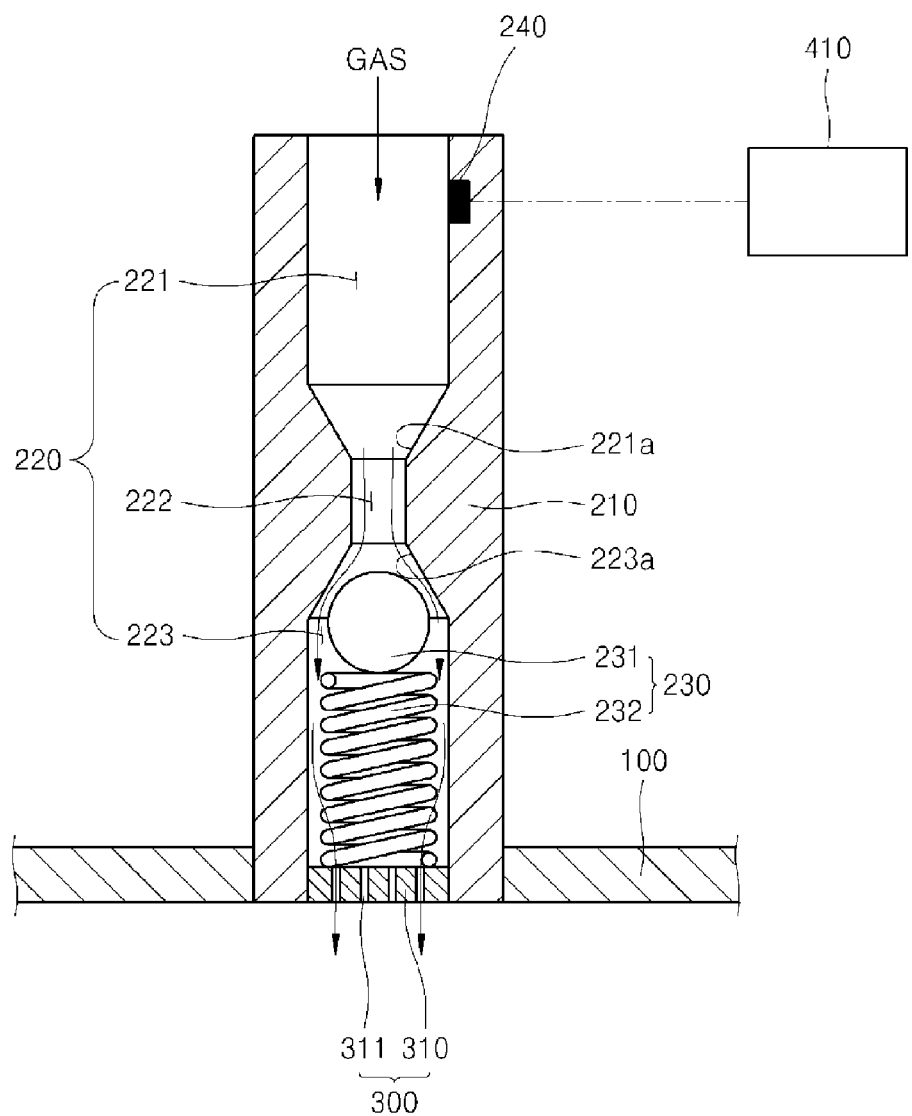
FIG. 4 is a partial sectional view of the foaming agent injector according to the embodiment of the present invention during supply of the foaming agent.

According to the embodiment of the invention, the polymer backflow prevention unit 300 includes the plurality of backflow prevention holes 311 each of which has a polygonal shape, as shown in FIG. 4 and FIG. 5.

The inner circumference forming the inclined surface of the rectangular backflow prevention hole 311 increases the contact surface area with the polymer resin when the polymer resin flows back inside the chamber 100.

Alternatively, the backflow prevention holes 312 may have a triangular shape as shown in FIG. 6, or the backflow prevention holes 313 may each have a cross shape as shown in FIG. 7.

The contact surface area with the polymer resin flowing back may be further increased by the inner circumference forming three faces in the triangular holes or the inner circumference forming a plurality of faces.

Therefore, the backflow prevention holes having polygonal shapes and formed in the backflow-prevention plate body can prevent the polymer resin from flowing back toward the channel of the foaming agent injection pipe.

FIG. 8 and FIG. 9 show other examples of the backflow prevention holes according to the embodiment of the present invention.

Referring to FIG. 8, the plurality of backflow prevention holes 315 according to the present invention may be tapered along the inside of the chamber 100 in the channel 220 of the foaming agent injection pipe 210.

When the foaming gas is injected from the channel 220 to the chamber 100, a flow speed of the foaming gas gradually increases while flowing along the backflow prevention holes 315. Eventually, the foaming gas can be injected into the chamber 100 while the flow speed thereof increases.

With this increase of the flow speed, backflow of the polymer resin can be more effectively prevented.

In addition, since the inner diameter of the backflow prevention hole 315 is gradually decreased along the inside of the chamber 100, backflow of the polymer resin can be further prevented in proportion to the decreased size of the holes.

Obviously, the backflow prevention holes 311 may have polygonal shapes, as shown in FIGS. 5 to 7.

Referring to FIG. 9, the backflow prevention holes 314 according to the present invention may include a plurality of protrusions 315a formed along the inner circumference thereof.

The protrusions 315a may include hemispherical protrusions or polygonal protrusions.

Further, the protrusions 315a may be continuously formed from an upper end to a lower end of the backflow prevention hole 311 on the inner circumference thereof.

Further, the protrusions 315a may be formed to increase in size along the chamber 100 such that the size of holes is gradually decreased along the chamber 100.

Accordingly, as the hole becomes narrower downward, the speed of injecting the foaming gas increases and the polymer resin is thus prevented from being easily introduced into the holes and flowing back.

In particular, the protrusions 315a increase the contact area with the polymer resin when the polymer resin flows back into the backflow prevention holes 315, thereby efficiently preventing the polymer resin from flowing back to the channel 220 of the foaming agent injection pipe 210.

According to embodiments of the invention, in a physical foam forming process of a thermoplastic polymer material, it is possible to efficiently prevent loss of the process due to backflow of the polymer resin toward the channel of the foaming agent injection pipe.

That is, the backflow prevention holes having a polygonal shape increase a surface area to volume ratio of the polymer resin, whereby the polymer resin having higher viscosity than foaming gas can be prevented from flowing back to the channel of the foaming agent injection pipe by resistance of the backflow prevention holes.

Further, according to embodiments of the invention, the foaming gas can increase the surface area to volume ratio of gas through the plurality of backflow prevention holes and can be more rapidly melted into the polymer resin.

Next, experimental results of backflow rates based on use of backflow prevention plates according to the present invention will be described with reference to Table 1.

TABLE 1

|  | Comparative Example No backflow prevention plate | Example 1 Backflow prevention plate A | Example 2 Backflow prevention plate B | Example 3 Backflow prevention plate C |
|---|---|---|---|---|
| Backflow rate | 83 | 40 | 35 | 30 |

Unit of backflow rate is $m^3/s$.

A backflow prevention plate A corresponds to the backflow prevention plate as shown in FIG. 5, a backflow prevention plate B corresponds to the backflow prevention plate shown in FIG. 6, and a backflow prevention plate C corresponds to the backflow prevention plate shown in FIG. 7.

Referring to the foregoing table, the backflow rate of the polymer resin in the comparative example is almost twice that in Example 1, and more than twice those in Examples 2 and 3.

Based on these results, it can be seen that the backflow prevention plate C having backflow prevention holes each having a cross shape can efficiently reduce backflow of the polymer resin.

Although the present invention has been described with reference to some embodiments, it will be apparent to those skilled in the art that various modifications can be made without departing from the spirit and scope of the invention.

Therefore, the scope of the invention should be limited only by the accompanying claims and equivalents thereof.

In other words, it should be understood that these embodiments are given by way of illustration only and do not limit the scope of the present invention, and that various modifications, variations, and alterations can be made without departing from the spirit and scope of the invention defined only by the accompanying claims and equivalents thereof.

The invention claimed is:

1. A polymer forming apparatus comprising:
   a chamber having a predetermined pressure and storing a molten polymer resin;
   a foaming agent injector connected to the chamber and supplying a foaming agent received from outside into the chamber by a pressure higher than or equal to a pressure inside the chamber, wherein the foaming agent injector comprises:
      a foaming agent injection pipe, wherein the foaming agent injection pipe comprises:
         an inlet channel forming an inlet for the foaming agent;
         an outlet channel forming an outlet for the foaming agent; and
         a middle channel connecting the inlet channel to the outlet channel and having a smaller inner diameter than the inlet channel and the outlet channel,
         wherein the inlet channel is connected to an upper end of the middle channel, and the inlet channel has an inlet-side inclined channel having an inner diameter gradually decreasing toward the upper end of the middle channel,
         wherein the outlet channel is connected to a lower end of the middle channel, and the outlet channel has an outlet-side inclined channel having an inner diameter gradually increasing downward from the lower end of the middle channel, and
         wherein the inlet-side inclined channel and the outlet-side inclined channel are symmetrical to each other with respect to the middle channel;
      an elastic shut-off unit elastically disposed inside the outlet channel to be placed at an outlet side of the middle channel, and configured to open or close the middle channel according to pressure of supplying the foaming agent, wherein the elastic shut-off unit comprises:
         a shut-off ball in the outlet-side inclined channel, wherein the shut-off ball is configured to open or close the outlet-side inclined channel; and
         an elastic member between the shut-off ball and a polymer backflow prevention unit, wherein the elastic member is configured to elastically support the shut-off ball;
      the polymer backflow prevention unit provided to the foaming agent injector and allowing the supplied foaming agent to pass therethrough while preventing the polymer resin from flowing back by increasing a contact surface area with the polymer resin, wherein the polymer backflow prevention unit is disposed at an end of the outlet channel and supports the elastic shut-off unit, and wherein the polymer backflow prevention unit comprises:
a backflow-prevention plate body disposed at the end of the outlet channel and supporting an end of an elastic member, wherein the backflow-prevention plate body is detachably coupled to the end of the outlet channel; and
a plurality of backflow prevention holes formed in the backflow-prevention plate body,
wherein the backflow preventing holes are spaced apart from each other, and a cross-sectional shape of each of the backflow prevention holes is a cross shape, each of the backflow prevention holes is tapered in a direction of supplying the foaming agent, and each of the backflow prevention holes has a plurality of protrusions on an inner circumference thereof,
wherein the plurality of protrusions comprises hemispherical protrusions or polygonal protrusions,
wherein the plurality of protrusions are continuous from an upper end to a lower end of the backflow prevention hole,
wherein the plurality of protrusions are formed to gradually increase in size along the chamber,
wherein an inner diameter of the backflow prevention holes are formed to gradually decrease along the inside the chamber,
wherein the backflow-prevention plate body is in a disk shape and detachably coupled to the lower end of the outlet channel, and
wherein a circumference of the backflow-prevention plate body and an inner wall of the lower end of the outlet channel are screwed to each other;
a first pressure sensor configured to sense a pressure generated during supply of the foaming gas;
a second pressure sensor configured to sense an internal pressure of the chamber; and
a foaming agent supply unit, wherein the foaming agent supply unit comprises:
a foaming agent supply line connected to the foaming agent injector, configured to supply the foaming agent to the foaming agent injector;
a valve configured to open and the close the foaming agent supply line; and
a controller electrically connected to the first pressure sensor and the second pressure sensor, wherein the controller is configured to supply the foaming gas when the pressure of the foaming agent is higher than the internal pressure of the chamber, and is configured to stop the supply of the foaming agent when the pressure of the foaming agent is lower than the internal pressure of the chamber,
wherein the foaming agent is an incompressible fluid.

2. The polymer forming apparatus according to claim 1, wherein the backflow prevention plate body is inclined from an edge toward a center in the direction of supplying the foaming agent.

* * * * *